(12) United States Patent
Kampmann et al.

(10) Patent No.: US 8,605,713 B2
(45) Date of Patent: *Dec. 10, 2013

(54) ENHANCED MEDIA GATEWAY NEGOTIATION

(75) Inventors: Dirk Kampmann, Vaals (NL); Jens Poscher, Niderkruechten (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 813 days.

This patent is subject to a terminal disclaimer.

(21) Appl. No.: 12/258,213

(22) Filed: Oct. 24, 2008

(65) Prior Publication Data

US 2009/0109987 A1 Apr. 30, 2009

Related U.S. Application Data

(60) Provisional application No. 60/982,877, filed on Oct. 26, 2007.

(51) Int. Cl.
*H04L 12/66* (2006.01)
*H04L 12/28* (2006.01)
*H04M 7/00* (2006.01)

(52) U.S. Cl.
USPC ........... 370/352; 370/389; 370/401; 379/219; 379/229

(58) Field of Classification Search
USPC ..................... 370/395.21, 400–401
See application file for complete search history.

(56) References Cited

U.S. PATENT DOCUMENTS

| | | | |
|---|---|---|---|
| 6,671,367 B1 * | 12/2003 | Graf et al. ..................... 379/229 |
| 7,212,622 B2 * | 5/2007 | Delaney et al. .......... 379/221.02 |
| 7,239,629 B1 * | 7/2007 | Olshansky et al. ........... 370/353 |
| 7,292,687 B2 * | 11/2007 | Graf et al. ..................... 379/219 |
| 2002/0032799 A1 * | 3/2002 | Wiedeman et al. .......... 709/245 |
| 2004/0003089 A1 * | 1/2004 | Chiu ............................. 709/227 |
| 2004/0101125 A1 * | 5/2004 | Graf et al. ..................... 379/229 |
| 2005/0243799 A1 * | 11/2005 | Saaskilahti et al. .......... 370/352 |
| 2006/0203809 A1 * | 9/2006 | Khuc ............................. 370/352 |
| 2009/0103530 A1 * | 4/2009 | Fartmann et al. ............. 370/389 |

* cited by examiner

Primary Examiner — Brandon Renner

(57) ABSTRACT

A method and system of negotiating Media Gateways (MGs) between a plurality of call control nodes (CCNs). The system includes an originating CCN which builds an original list of configured Media Gateways capable of being used in a call by the originating CCN. The first CCN associates an identifier and a priority with each Media Gateway in the list prior to sending the list to a subsequent CCN. The subsequent CCN removes from the original list any identifiers associated with any MG in the original list of identifiers which is not capable of being used in the call by the subsequent CCN. The subsequent CCN then forms a modified list of identifiers associated with at least one MG capable of being used in a call by the originating CCN and the subsequent CCN. The subsequent CCN also selects a specified MG from the modified list and sends a first backward message from the second CCN to the originating CCN identifying the specified MG. The originating CCN may then validate that the specified MG is on the original list of identifiers and selects the specified MG for the call.

23 Claims, 9 Drawing Sheets

ENHANCED MEDIA GATEWAY NEGOTIATION

CROSS-REFERENCE TO RELATED APPLICATIONS

This application is related to application Ser. No. 12/206,218 entitled "System and Method for Media Gateway Negotiation" filed on Sep. 8, 2008. This application also claims the benefit of U.S. Provisional Application No. 60/982,877, filed Oct. 26, 2007 the disclosure of which is incorporated herein by reference. The entirety of both applications is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to communications networks. More particularly, and not by way of limitation, the present invention is directed to a system and method for media gateway negotiation in a telecommunications network.

Layered network architecture is commonly used in telecommunication networks. At call setup, a Call Control Node (CCN) acts as a Media Gateway Controller (MGC). The CCN, such as a Mobile service Switching Center (MSC), Gateway MSC (GMSC), a Transit Switching Center (TSC) or a Media Gateway Control Function (MGCF), selects a Media Gateway (MG) to switch the user plane and to provide in-band equipment if necessary.

In many call cases, multiple CCNs are involved in call setup. Call setup information is signaled between CCNs using call control protocols, such as Integrated Services Digital Network User Part (ISUP), Bearer Independent Call Control (BICC) or Session Initiated Protocol (SIP). When a CCN selects a MG, call control protocols may provide a capability to send the identifier of the selected MG to the succeeding CCN. The succeeding CCN has the choice to select the same MG for user plane switching. In many cases selecting the same MG in subsequent CCN's allows better resource utilization in the nodes and in the network.

A typical call setup scenario for telephone calls (mobile or fixed), utilizes a procedure of forward bearer setup. In this scenario, the bearer is established from the calling side towards the called side. FIG. 1 is a simplified block diagram of forward bearer setup utilizing the BICC call control protocol. A preceding CCN 102 and a succeeding CCN 104 each controls a MG (MG 105 and MG 106 respectively) for user plane switching. In order to achieve forward bearer setup, the succeeding CCN 104 selects a MG first and sends a MG identifier and bearer address information backwards to the preceding CCN 102. The preceding CCN 102 then selects the MG and initiates bearer setup procedure. A mobile station (MS) 120 may operate in, any network (fixed or mobile), but, in this example, a GSM/EDGE Radio Access Network (GERAN) 122 is used. The CCN 102 communicates with the mobile station 120. An MS 124 operates in a GERAN 126 and communicates with the CCN 104. The CCN 102, CCN 104, MS 120, and MS 124 communicate on a signaling plane. The MS 120, MS 124, MG 104, and MS 106 communicate on a user plane.

An Initial Address Message (IAM) message is sent in 130 from CCN 102 to CCN 104 providing call setup information. Next, in 132, the CCN 104 selects the MG 106 and seizes MG resources for the connection end point. An identifier for MG 106 is sent back from CCN 104 to CCN 102 at 134 (e.g., APM (Bearer Control Unit Identifier (BCU-ID)). At 136, the CCN 102 then selects a MG and seizes MG resources for the connection end point. Triggered from CCN 102, MG 105 starts bearer establishment procedures at 138. When Internet Protocol (IP) is used as the user plane transport protocol and BICC is used as the call control protocol, then bearer setup messages are tunneled (not shown) via call control nodes, CCN 102 and CCN 104.

In practice, oftentimes the succeeding node CCN 104 can select from a set of MGs without knowing which MGs can be selected in the preceding node CCN 102. Consequently, there is no guarantee that the MG selected in CCN 104 can also be selected in CCN 102. If CCN 102 and CCN 104 do not select a common MG, longer user plane routes may result.

FIG. 2 is a simplified block diagram of an exemplary existing forward bearer setup utilizing three sites. A network 200 includes a preceding CCN 210 and a succeeding CCN 212. The network includes a MG 214, MG 216, and MG 218. The network includes a MS 222 in GERAN 224. In addition, FIG. 2 illustrates a Public Switched Telephone Network (PSTN) 226. The CCN 210 and MG 214 are located in site 1. The CCN 212 is located in site 2. The MG 216 is located in site 3 and the MG 218 is located in site 4. The MS 222 and CCN 210, CCN 210 and CCN 212, CCN 210 and MG 214, CCN 212 and MG 216, CCN 212 and MG 218, and CCN 212 and the PSTN 226 communicate on a signaling plane. MS 222 communicates with MG 214, MG 216 and MG 218, MG 218 and PSTN 226, and MG 214 and MG 216 communicate on a user plane.

In this example, it is assumed that CCN 212 has to play an announcement, for example due to Intelligent Network (IN) interworking, before the call can be routed to the destination network (e.g., PSTN 226). At the end of the call setup, the MGs on three sides are involved in the call. In GERAN 224, setup message 230 is sent from MS 222 to CCN 210. Next, in 232, CCN 210 sends a BICC IAM message to CCN 212. In 234, CCN 212 determines that an announcement must be played (e.g., due to IN interworking). Next, in 236, CCN 212 selects a MG to establish the bearer (user plane) and to play an announcement. As illustrated, CCN 212 selects MG 216. In 238, CCN 212 sends an identifier of MG 216 backwards to CCN 210. In this example, it is assumed that CCN 210 is unable to select MG 216. Therefore, in 240, CCN 210 selects another MG, in this case, MG 214. In 242, a bearer is established between MG 214 and MG 216 and CCN 210 establishes as well the connection between MS 222 and MG 214 (not shown). In 244, CCN 212 continues call setup after the announcement is played. CCN 212 identifies the call to be routed to PSTN 226. Next, in 246, CCN 212 selects a MG that can connect the user plane to PSTN 226, in this case, the MG 218. Another bearer is then established between MG 216 and MG 218 at 248 and between MG 218 and PSTN 226.

Existing forward bearer setups suffer from the disadvantage of oftentimes utilizing unnecessarily long user plane routes. In addition, extra network resources are utilized for the bearer setup. It would be advantageous to have a bearer setup which conserves network resources while providing a forward bearer setup The present invention provides a methodology to negotiate MGs between call control nodes that can be used in a call.

This negotiation method provides the opportunity for subsequent call control nodes to agree on a common MG node. Such a selection improves the usage of resources in the network.

SUMMARY

In a first aspect a method of negotiating Media Gateways (MGs) for use in a call between call control nodes (CCNs) is disclosed. The method begins by configuring each Media Gateway in the network. An identifier is associated with each Media Gateway in the network. An originating CCN begins the negotiating session by sending a call setup message to another, or subsequent, CCN, The message includes a list of identifiers of Media Gateways acceptable to the originating CCN. This subsequent CCN could be a transfer type of CCN or it could be a terminating CCN. The subsequent CCN reviews the list of configured Media Gateways that are eligible for the call and determines eligible Media Gateway(s) in the list. The subsequent CCN then selects a Media Gateway from the remaining Gateways according to a priority that was assigned by the first CCN.

In a further aspect, a method is disclosed of negotiating Media Gateways (MG) between call control nodes (CCNs), which comprises a first CCN assembling a list of Media Gateway identifiers in which the identifiers are associated with configured Media Gateways that are supported by the first CCN. The list of identifiers is then associated with a single identifier and the single identifier is sent to a second control node instead of the complete list In another aspect the Media Gateway Group identifier is modified to include all configured Media Gateways that are situated in more than one region and supported by the first CCN.

In another aspect a Call Control Node for negotiating configured Media Gateways for completing a call between Call Control Nodes is disclosed. The Call Control node comprises means for associating each configured Media Gateway with a unique identifier that is known to all CCNs. The CCN further includes means for sending a call setup message to another, subsequent CCN. The message includes a list of configure Media Gateways eligible for the call and the sending CCN prioritizes the eligible Media Gateways in the list. The subsequent CCN has means for receiving the message and removing any unsupported Media Gateways from the list. The subsequent CCN then selects a Media Gateway from the remaining prioritized Media Gateways and returns the modified The present invention discloses prioritizing MGs by the originating CCN, an identifier is provided for describing large MG groups sent in the call control protocol and a regional Media Gateway Group (MGG) identifier associated with, e.g., MG groups in regions and border type groups. Pooled CCNs, where a number of CCNs serve a combined area as one large area, CCN Blade Clusters (BC), where a CCN internal architecture is based on a blade approach also utilize the MGG identifiers. The pool and the blade concept allow for enhanced reliability and offer enhanced load distribution and scalability.

Arranging identifiers (BCU-IDs) within a list is but one method of prioritizing. However, other concepts may be used such as assigning a priority value to each identifier, or using a delimiter, e.g. a certain BCU-ID which is agreed on as being used as a delimiter may separate different portions within a list, to indicate different levels of prioritizations. Such a delimiting BCU-ID could also be a BCU-ID which is not within the respective controlled Media Gateways of the receiving sides. In more detail, sending a priority or a prioritization within MG negotiation provides for a guarantee that an optimal MG—seen from the originating and terminating CCN—is selected with a preference at the end of the negotiation chain.

BRIEF DESCRIPTION OF THE DRAWINGS

In the following section, the invention will be described with reference to exemplary embodiments illustrated in the figures, in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The present invention provides a procedure to negotiate MG nodes, between call control nodes, that can be used in a call. This negotiation procedure provides the opportunity for subsequent call control nodes to agree on a common MG. Such a selection improves the usage of resources in the network. The call control node that sends a call setup message (e.g. IAM in BICC) in a forward direction adds to the message a list of MGs which are eligible for the call. Any subsequent CCN removes those MG nodes from that list which the subsequent CCN does not know or cannot select for the call. A CCN that has to establish the user plane, for example an announcement has to be played, selects a MG from the negotiated list of MGs, which is used to establish the user plane. The identifier of the selected MG node is sent in a backward direction, giving the preceding node the opportunity to select the same MG node and use the selected MG to establish the user plane. The present invention provides a system and method to negotiate a common MG between CCNs including in systems for call cases where forward bearer setup is applied.

Figure 1:
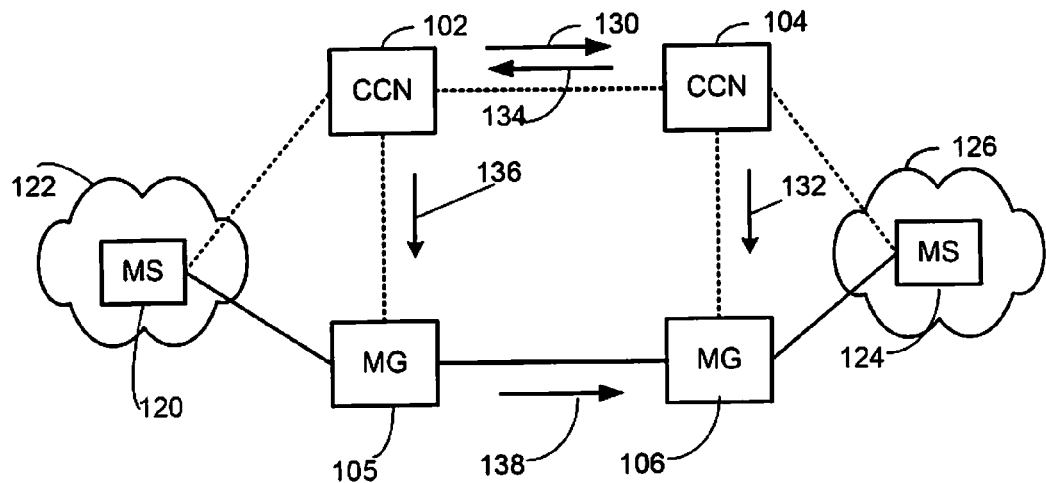
FIG. 1 depicts, schematically, the principle of Forward Bearer setup using Bearer Independent Call Control protocol (BICC)
Figure 3A:
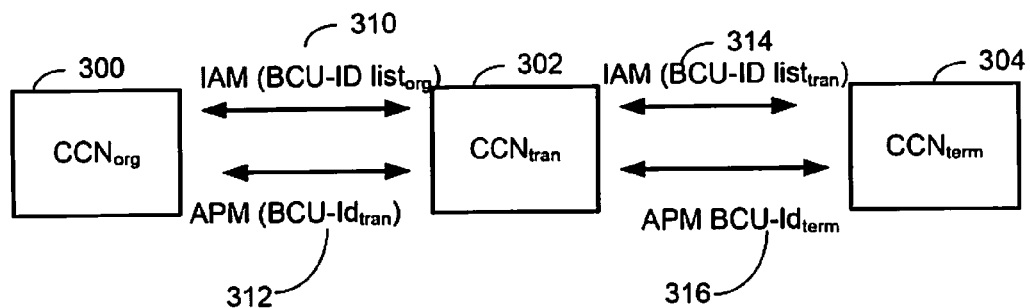
FIG. 3a illustrates schematically the Media Gateway negotiation in accordance with an embodiment of the present invention.
Figure 2:
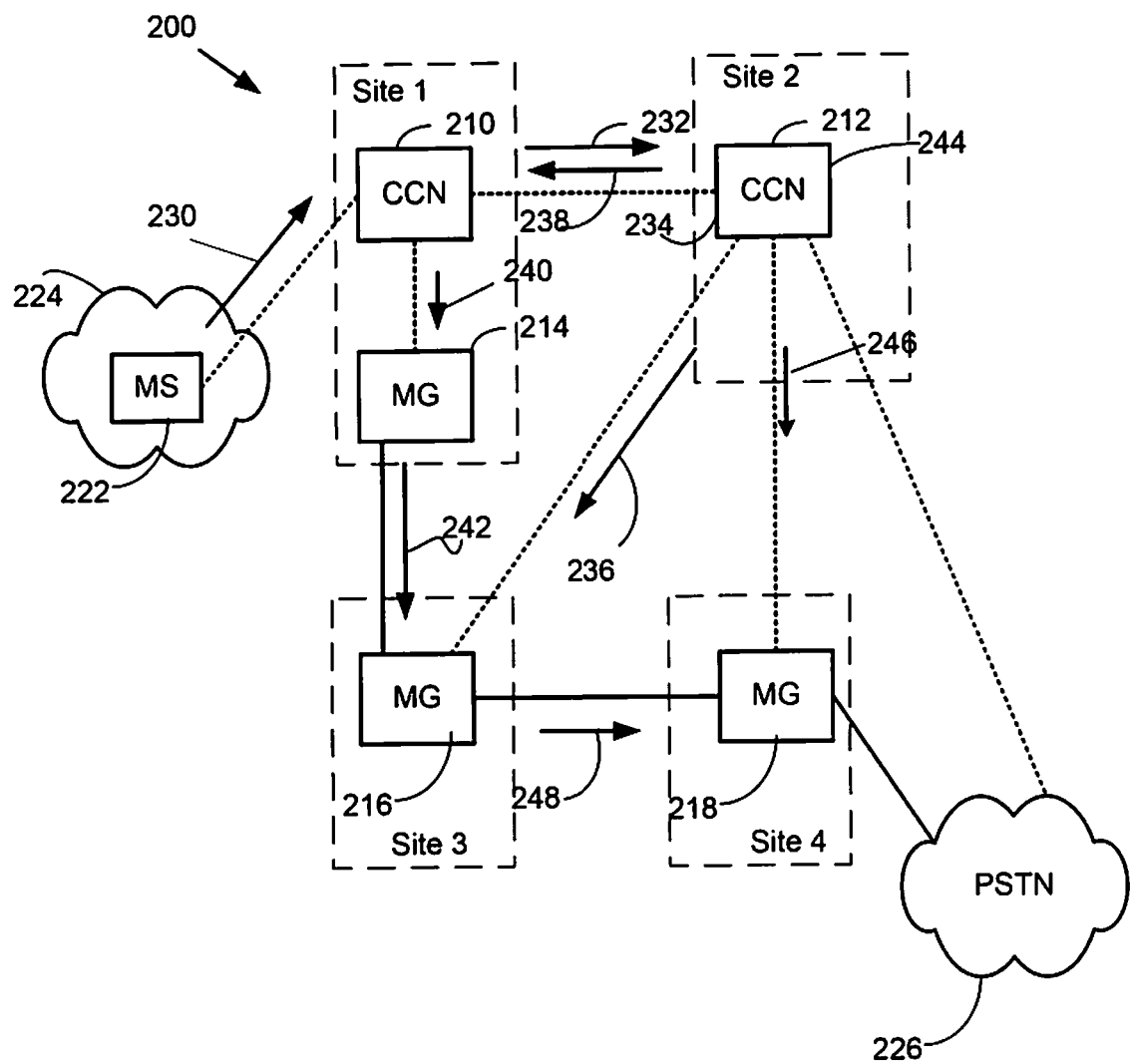
FIG. 2 shows schematically a call setup involving three sites.

The following acronyms used in this document are defined as follows:
AN Access Node
BC Blade Cluster
BCU-ID Bearer Control Unit Identifier
BICC Bearer Independent Call Control protocol
BSC Base Station Controller
CCN Call Control Node
IVD Invention Disclosure
MGG Media Gateway Group
MG Media Gateway
MSC Mobile Switching Center
MGC Media Gateway Controller
MRI Media Region Identifier
PoI Point of Interconnect
RNC Radio Network Controller FIG. 3a illustrates a simplified block diagram of a plurality of CCNs utilizing MG node negotiation according to the teachings of the present invention. The drawings reference a mobile communication network. However, the embodiments are equally applicable towards fixed communication networks, where corresponding nodes in the fixed network perform the same functions as, e.g., a Call Control Node performs in the wireless/mobile network.

A Call Control Node prepares and sends a call setup message (e.g. IAM in BICC, or a SIP Invite message) in a forward direction where the message includes a list of MG nodes that are usable by the Call Control Node. Subsequent nodes that receive the message select a Media Gateway from this list that is usable by the subsequent nodes and common to both the first and subsequent CCNs.

The originating CCN, $CCN_{org}$ 300 assembles a list of identifiers (BCU-ID list$_{org}$) of configured Media Gateways that can be used by $CCN_{org}$ to establish a call. Each of the identifiers are prioritized and each CCN selects the identifiers according to priority. This list is added to the call setup message 310, which is sent towards a subsequent CCN ($CCN_{tran}$ or $CCN_{term}$). The receiving node, in this instance $CCN_{tran}$ 302, removes any unknown identifier from the list and any identifier associated with a Media Gateway node that cannot be used by $CCN_{tran}$ 302. Next the message is sent to $CCN_{term}$ 304 with the list of identifiers (BCU-ID list$_{tran}$ 314) modified by $CCN_{tran}$.

Receiving node $CCN_{term}$ 304 repeats the process of removing any unknown identifier and any identifier that is associated with a Media Gateway node that will not support the call between the originating Call Control Node and the terminating node. Terminating node $CCN_{term}$ 304 then selects a Media Gateway identifier remaining on the list, according to the priority of the identifiers, and is marked by $CCN_{term}$ allowing a subsequent CCN (e.g., $CCN_{tran}$) to select the identifier. This Media Gateway identifier is sent in a backward direction BCU-ID$_{term}$ 316 to $CCN_{tran}$ 302. $CCN_{tran}$ 302 validates that the received Media Gateway identifier is included in the list BCU-ID list$_{tran}$ 314. If this is the case it forwards the received BCU-ID to $CCN_{org}$. If this is not the case it selects a Media Gateway identifier from the list BCU-ID list$_{tran}$ 314 according to the priority of the identifiers and sends this Media Gateway identifier to $CCN_{org}$. The received Media Gateway identifier is checked by $CCN_{org}$ to make sure that it was specified on the list $CCN_{org}$ sent out in the IAM message. (All the CCN involved in the process use the selected MG, identified by the selected BCU-ID, for user plane establishment).

If any CCN is unable to find a usable Media Gateway, the individual CCN selects a Media Gateway that may not be on the list and adds the chosen Media Gateway to a new list and marks the MG according to its priority before forwarding to the next CCN. This list is added to the call setup message, which is sent (e.g., as an IAM) to the next CCN (i.e., $CCN_{tran}$), which may forward the message to another CCN in this example to $CCN_{term}$. When $CCN_{tran}$ receives a backward message (e.g., an Application Transport Mechanism (APM)), if the message includes a MG node identifier (BCU-ID$_{term}$), $CCN_{tran}$ validates that the identifier is specified in the list sent in IAM (BCU-ID list$_{tran}$). If the received identifier is specified in the list, then the receiving CCN selects the MG for call establishment. Otherwise, the CCN selects any MG from the outgoing list (BCU-ID list$_{tran}$) according to the priority of the identifiers for call establishment. If the message does not include a MG node identifier, $CCN_{org}$ 300 then selects for call establishment any MG node from the outgoing list, BCU-ID list$_{tran}$, according to the priority of the identifiers.

A CMN (call mediation node, not shown) may be involved in passing the messages between call control nodes. The CMN does not control MGs and preferably, transparently transfers the list of MG node identifiers between the controlling nodes.

Figure 3B:
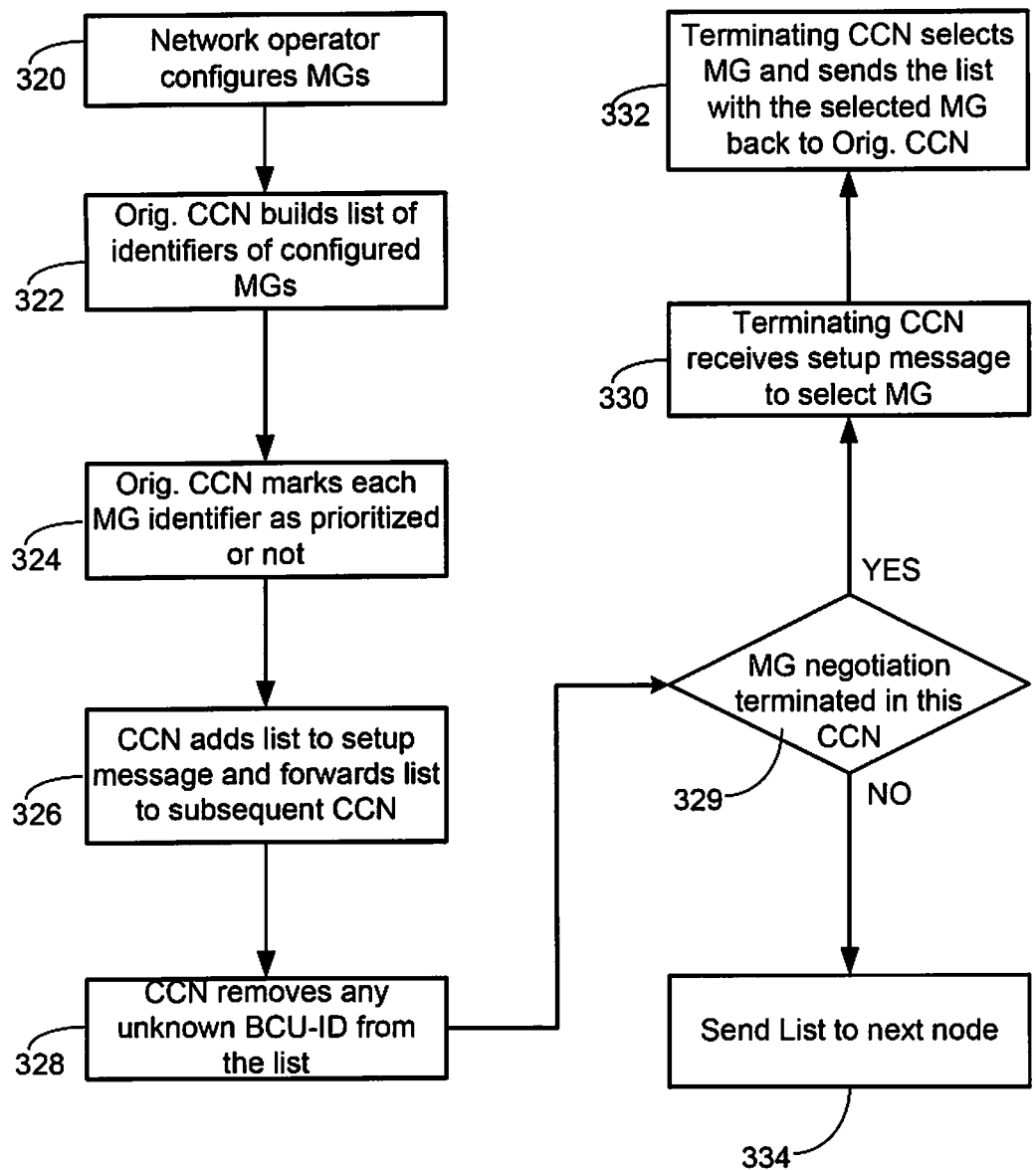
FIG. 3b depicts a high level flow diagram of a process of Media Gateway negotiation in accordance with an embodiment of the present invention.

FIG. 3b illustrates a high level flow diagram of process for negotiating Media Gateways (MGs) for use in a call in a network between Call Control Nodes (CCN). The process begins when the network operator configures the MGs in the networks (step 320). When an originating CCN begins to set up a call, all the configured MGs available to the CCN for making a call are associated with individual identifiers (BCU-ID in BICC) and combined in a list (step 322). The list of identifiers is then marked with a priority by the originating CCN and the CCN identifies the eligible MGs in the list (step 324).

The originating CCN inserts the list of MG identifiers in a call setup message and sends the message to a subsequent CCN which may or may not be a terminating CCN (step 326). If the CCN is not the terminating CCN, e.g., a CMN, the CMN will pass the message and the list on to the terminating CCN. If an intermediate CCN is involved in the call setup, the intermediate CCN removes identifiers that it does not support from the list and makes a selection of identifiers according to priority. This will leave priority and non-priority identifiers in the list for a further, or terminating, CCN to select from (step 328).

The further or terminating CCN now has a list of MG identifiers to select from that have assigned priorities and are supported by the originating and intermediate CCNs. There are likely MG identifiers that are not prioritized and some identifiers that are just listed with no eligibility or priority markings (step 330). The terminating CCN makes a selection according to the prioritized identifiers that are left in the list. (step 332) and sends the selected MG identifier back to the preceding CCNs. If, by the time the terminating CCN receives the list there are no selected, prioritized identifiers, the terminating CCN selects one of the configured MG identifiers in the list and returns the selected MG identifier to the originating CCN. And, if the message sent to the preceding CCNs does not include a MG node identifier at all then the originating CCN selects for call establishment any MG node from the original list BCU-ID list$_{org}$ according to the priority of the identifiers.

If the setup message includes Regional Identifiers rather than a single list of MG identifiers (BCU-IDs, for instance) that means that the identifiers included in the list represent groups of Media Gateways. The identifier representing multiple MGs is identified as $BCU\text{-}ID_{MGG}$, where MGG refers to a Media Gateway Group.

A call control node that transfers the call setup message but has to select a MG node for the call, i.e. a transferring CCN ($CCN_{tran}$), receives a call setup message (e.g. IAM in BICC) and if this message includes a list of MG node identifiers ($BCU\text{-}ID_{org}$) then $CCN_{tran}$ removes any unknown BCU-ID from the list ($BCU\text{-}ID_{org}$). The $CCN_{tran}$ removes any BCU-ID from the list that is associated to a MG node that cannot be used for the call and the $CCN_{tran}$ processes the remaining list BCU-ID $list_{tran}$ as follows:

If there is at least one element left in the list the $CCN_{tran}$ forwards the list (BCU-ID $list_{tran}$) in the call setup message to the succeeding node. If, however, the received list is empty or the received message does not include a list of MG node identifiers, it starts MG node negotiation towards the succeeding CCN, which could be again a transiting CCN or the terminating CCN. For simplicity, it is assumed that the succeeding CCN is a terminating CCN. $CCN_{tran}$ then builds and sends a BCU-ID list as described for $CCN_{org}$.

When $CCN_{tran}$ receives in the end a backward message (APM $BCU\text{-}ID_{term}$) then the actions performed are dependent on whether there is a prioritized MG node identifier received at all and of the received MG node identifier itself.

If the message includes a MG node identifier ($BCU\text{-}ID_{tran}$), $CCN_{tran}$ validates if the identifier is specified in the previously forwarded list (BCU-ID $list_{tran}$). If the received identifier is specified in the forwarded list BCU-ID $list_{tran}$ then the CCN selects the MG node for call establishment. Otherwise $CCN_{tran}$ selects for call establishment the highest priority MG node that is listed in the previously sent list BCU-ID $list_{tran}$.

If, however, the backward message does not include a MG node identifier at all then $CCN_{tran}$ selects for call establishment the highest priority MG node that is listed in the previously sent list BCU-ID $list_{tran}$. Thereafter, the BCU-ID of the selected MG node is passed in backward direction ($BCU\text{-}ID_{tran}$) as it defined in current standards.

A call control node that terminates MG node negotiation ($CCN_{term}$) performs the following:

A terminating CCN hereinafter referred to as $CCN_{term}$ receives a call setup message (e.g. IAM in BICC). If this message includes a list of MG node identifiers then $CCN_{term}$ removes any unknown BCU-ID from the list and the $CCN_{term}$ removes any BCU-ID from the list that is associated to a MG node that cannot be used for the call. Then, the $CCN_{term}$ processes the remaining list, BCU-ID $list_{tran}$, by selecting one of the remaining elements in the list and using the associated MG node to establish the user plane. If the list is empty then $CCN_{term}$ selects any MG node that is applicable for the call. If the received call setup message does not include a list of MG node identifiers, then $CCN_{term}$ selects any MG node that is applicable for the call.

As a further improvement and in a further embodiment, In the following, the further embodiment will be described where differences to the first embodiment are necessary to explain. Again for illustrative purpose, it will be referred to an example based on a BICC protocol.

If BICC is used as call control protocol, then it is proposed to define $BCU\text{-}ID_{MGG}$ with the same data format as BCU-ID as defined for the BICC protocol, which at the current stage refers to 5 octets. This value of 5 octets can be passed within a standard BICC message without any modification. Any node that does not know the value will ignore this parameter according to current BICC standard. Nodes supporting the usage of a $BCU\text{-}ID_{MGG}$ will treat the value $BCU\text{-}ID_{MGG}$ as an identifier for a set of MG nodes.

Figure 4:
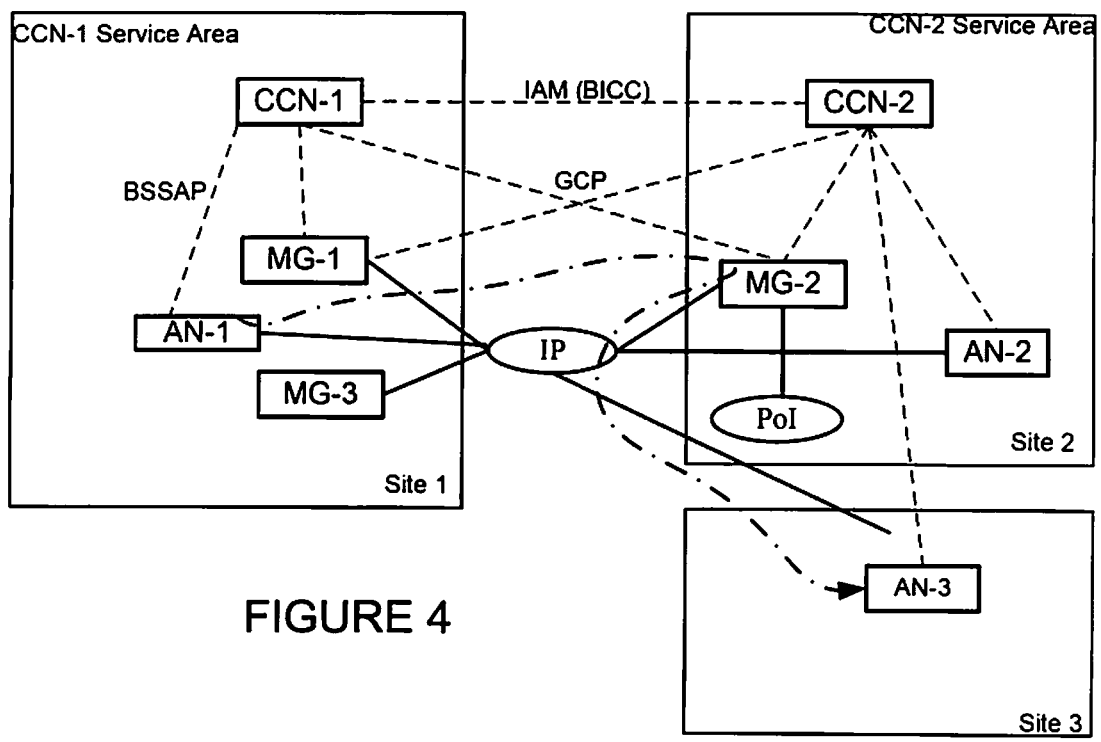
FIG. 4 depicts Media Gateway selection without prioritization according to another embodiment of the invention.

FIG. 4 depicts Media Gateway selection without prioritization according to another embodiment of the invention. Dashed lines indicate logical connections within the signaling plane, whereas solid, linear lines indicate physical connections. Curved, broken lines indicate a possible call case originating from AN1 and terminating at AN3 via MG-2, i.e. a user plane connection. Furthermore, the protocols indicated, such as BSSAP (Base Station System Application Part), BICC (Bearer Independent Call Control), GCP (Gateway Control Protocol) also referred to as Megaco or MGCP or H.248, are to be understood as a reference for a possible embodiment but also indicating the functionality which could be embodied by corresponding messages within other protocols.

CCN-2 receives an MG list (not shown) from CCN-1 in the IAM (BICC) message, indicating "any MG" can be used for the call (designated "ANYMG"). Within FIG. 4, IP address interconnection of the Media Gateways is done via the operator network and a Point of Interconnect (PoI), for interconnecting to other fixed networks, e.g., Public Switched Telephone Network (PSTN) also referred to as Plain old telephone service (POTS) or to other mobile networks, such as Public Land Mobile Networks (PLMN). This is the case because AN1 (access node) can contact each MG on the IP interface.

A call from Site 1 to Site 3 basically can be handled with the same probability in any of the three MGs of the network, because CCN-2 also has no prioritized MG for the destination, AN2. The result can be that user plane traffic trombones (passing through the backbone several times) the three sites (see FIG. 5 for an alternative solution). This problem can become even worse in large networks with many MGs deployed, where no MG is placed close to the receiving AN3.

[Furthermore, an "ANYMG" list can get very long. Especially, with pooled CCN or CCN Blade Cluster (BC) the served Radio Access areas will be very large and with this the number of controlled MGs.

In the case that one CCN would send a large list or even a complete list of known MGs, the MG negotiation mechanism would generate long messages, a compression concept of this list, Media Gateway Group, is proposed. By selecting common MGs, resource utilization is improved within the network. The present invention may also be applied for the standard BICC protocol without impacting current BICC standards. Although three CCNs are illustrated, it should be understood that the present invention may be incorporated in any system with two or more CCNs. Thereafter, the $CCN_{term}$ sends backward the BCU-ID of the selected MG node ($BCU\text{-}ID_{term}$) as defined in current standards.

As a further improvement and in a further embodiment, instead of sending a list of BCU-IDs it is foreseen to send as well one or more identifier(s) for (a) set(s) of MG nodes, hereafter referred to as $BCU\text{-}ID_{MGG}$, where MGG refers to Media Gateway Group.

As already indicated a priority indication introduced in the MG group is sent from a (first) CCN to a succeeding CCN during MG Negotiation procedure. The priority indication can be associated to none, one or more MG nodes in the exchanged list. Several possibilities exist:

The MG list contains only prioritized MG nodes

The MG list contains prioritized and non-prioritized MG nodes

The MG list contains prioritized MG nodes and any other defined MG

Any MG defined in the network is marked as prioritized A special option is the case that reuses existing mechanisms in the standard, where a single MG identifier (BCU-ID) can be sent from one node to the succeeding node. According to the standard this information is sent in call cases where the preceding node selected a MG node.

This parameter is supported as well in call cases where the preceding nodes have not selected a MG yet but prefers selection of the indicated MG node. With this solution MG selection is improved even if the succeeding node supports the BICC protocol without any proposed enhancement of MG negotiation.

Figure 5:
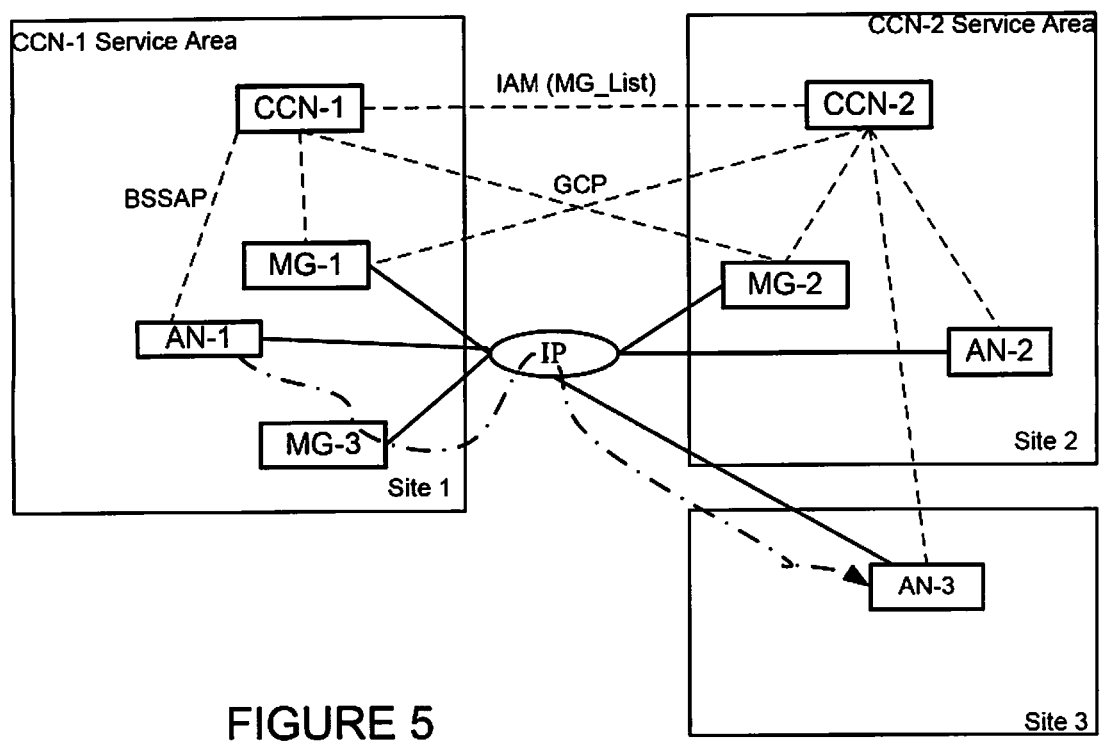
FIG. 5 illustrates an enhanced Media Gateway selection without prioritization according to a further embodiment of the invention.

FIG. 5 illustrates an enhanced Media Gateway selection with prioritization according to a further embodiment of the invention, resolving the problem described in FIG. 4. Dashed lines indicate logical connections within the signaling plane, whereas thick solid linear lines indicate physical connections. Curved, broken lines indicate a possible Call case originating from AN1 and terminating at AN3 via MG-3, i.e. a user plane connection. In this example, MGG AN1=ANYMG, {MG-1, MG-3} indicates that the MGG is generated by AN1. The MGG indicates the MG nodes to be used (preferably) by CCN-2 when the call originates from AN1. The message sent from CCN-1 to CCN-2 includes the setup message IAM (MG_list={prioritized MGs, other MGs}). The CCN terminating MG selection can select a MG next to AN-1 because it received a priority indication from CCN-1.

As an enhancement of the MG negotiation procedure specified in the beginning, the following cases have to be taken into account when a MG negotiation procedure is described:

Is a MG selected on incoming side? The CCN-1 has selected a MG at the time the IAM is sent or it has not selected a MG. A MG can be selected, for example, if a TDM connection is used on the call incoming (originating) side.

Is a common MG selected on incoming and outgoing side? In some call cases CCN-1 has selected a MG for resources used on the incoming (originating) side, e.g. connected to a TDM link. In a sub-set of these call cases this MG can be reused to seize resources for the outgoing trunk. In the remaining number of call cases the MG cannot be reused to seize resources for the outgoing trunk, i.e. on incoming and outgoing side different MG nodes have to be selected.

Is a BCU-ID received? CCN-1 does not receive any MG information from a previous CCN or it receives MG information (BCU-ID) from a previous CCN.

The following table describes when MG negotiation is started and when BCU-ID is sent in a forward direction. BCU-ID is defined in existing BICC standard and identifies a MG node. Note that MG negotiation is started when IAM is sent. The table below can also be used for designing corresponding decision logic

TABLE 1

Rules to control start of MG Negotiation

| MG selected on incoming side | Common MG on incoming and outgoing side | BCU-ID received | Action |
| --- | --- | --- | --- |
| Yes | Yes | Don't care | Send MG selected on incoming side in BCU-ID to next node. Don't start MG negotiation |
| Yes | No | Don't care | Start MG negotiation, i.e. send list of MG nodes including priority information |
| No | Not known when IAM is sent, Don't care | No | Start MG negotiation, i.e. send list of MG nodes including priority information |
| No | Not known when IAM is sent, Don't care | Yes | Case 1: Received BCU-ID is included in the MG list, which can be used in MG negotiation Forward the received BCU-ID. Start MG negotiation, i.e. send list of MG nodes including priority information Case 2: Received BCU-ID is not included in the MG list, which can be used in MG negotiation Start MG negotiation, i.e. send list of MG nodes including priority information. Don't send BCU-ID. |

Figure 6:
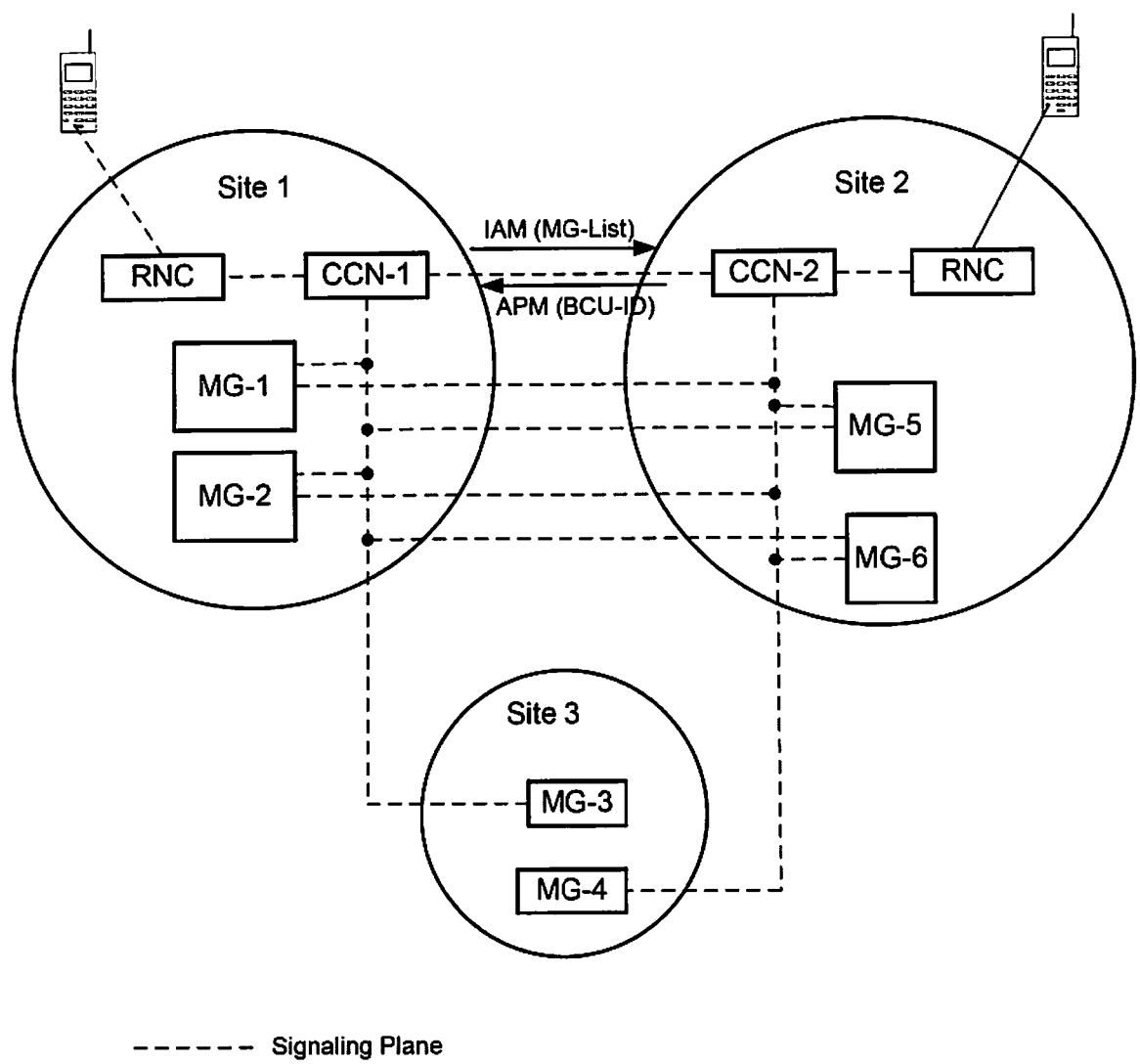
FIG. 6 depicts a call case where no Media Gateway is selected, no BCU-ID is received, and Media Gateway negotiation is initiated according to a further embodiment of the invention.

FIG. 6 depicts a call case where no Media Gateway is selected in CCN-1, no BCU-ID is received in CCN-1, and Media Gateway negotiation is initiated from CCN-1 according to a further embodiment of the invention shows a call case where no MG is selected in CCN, and no BCU-ID is received. CCN, starts MG negotiation and indicates prioritization in the MG list, i.e., IAM (MG-list={MG-1[prioritized], MG-2[prioritized] MG-3, MG-5, MG-6}).

The network operator decides that MG-1 and MG-2 should be selected with higher priority for calls served from the Radio Network Controller located in and controlled by CCN-1. The operator decides that MG-5 and MG-6 should be selected with a higher priority for calls from the RNC controlled by CCN-2.

CCN-2, which terminates MG negotiation, removes unsupported MG nodes from the received MG list (MG-3). MG nodes in CCN-2 may be configured as prioritized as well. CCN-2 adds such a marking to MG nodes specified in the received MG list (MG-5 and MG-6). Then CCN-2 tries to select any MG marked as prioritized. In this instance MG-1, MG-2, MG-5 and MG-6 are marked as prioritized and CCN-2 selects, for example, MG-5. CCN-2 then sends a backward message containing the information APM(BCU-ID=MG-5). If there is no prioritized MG then MG selection as defined in the beginning is applied.

CCN-2 sends the information about the selected MG back to CCN-1. If this MG is specified in the MG list generated originally in CCN-1 then CCN-1 reuses this MG. If the received MG information is not in the MG list then CCN-1 selects a MG marked as prioritized in the original MG list. If no MG is marked as prioritized, CCN-1 selects any of the MG specified in the MG list. The prioritization marking in the MG list can be a simple indication, e.g. 'prioritized' or the priority level.

Figure 7:
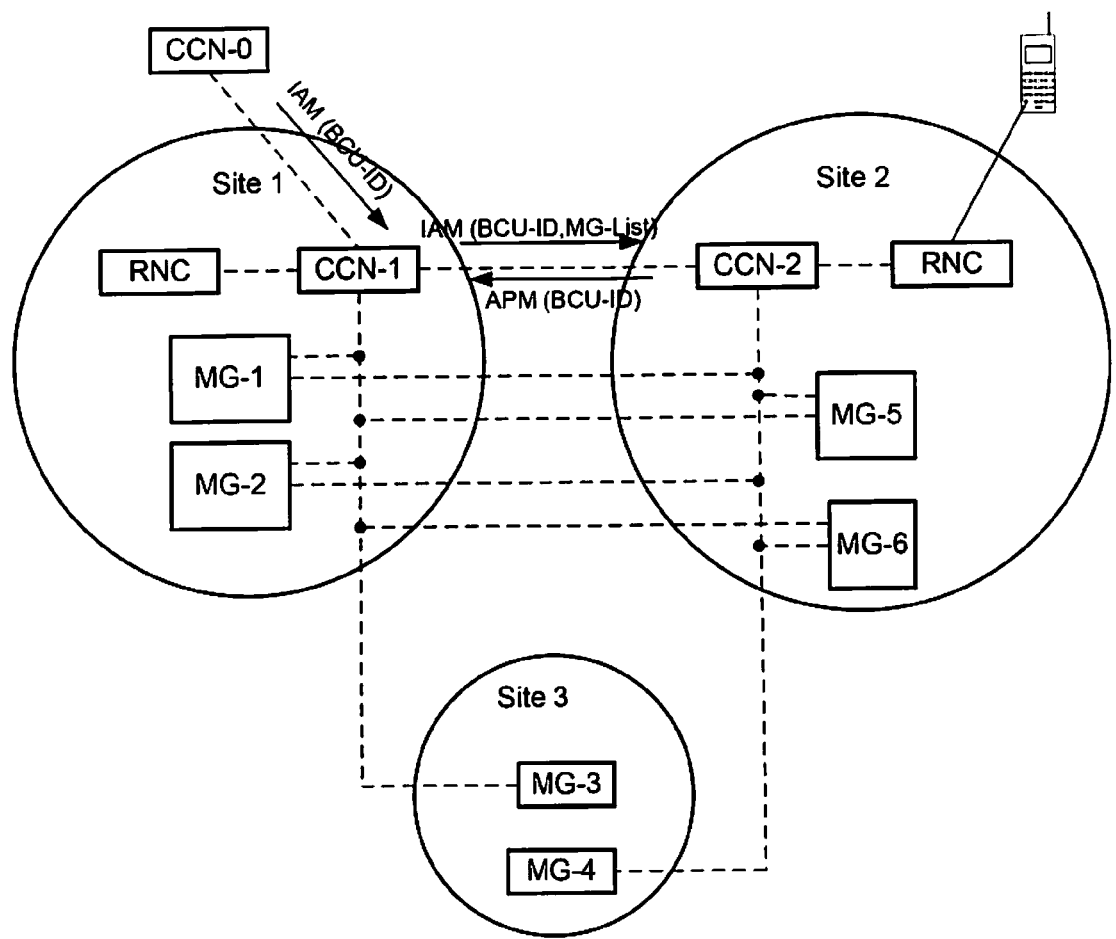
FIG. 7 illustrates a call case where no Media Gateway is selected, a BCU-ID is received, Media Gateway negotiation started, and a BCU-ID is sent according to another embodiment of the present invention.

FIG. 7 illustrates a call case where no Media Gateway is selected, in CCN-1 prior to sending IAM, a BCU-ID is received in CCN-1, Media Gateway negotiation started from CCN-1, and a BCU-ID is sent according to another embodiment of the present invention. In this example, as above, the network operator decides that MG-1 and MG-2 should be selected with higher priority for calls served from the Radio Network Controller located in and controlled by CCN-1. The operator decides that MG-5 and MG-6 should be selected with a higher priority for calls from the RNC controlled by CCN-2.

In this example, CCN-1 receives a BCU-ID of the preceding node; IAM(BCU-ID=MG-1). The BCU-ID is included in the list of MG nodes generated for MG negotiation. A MG is not selected in CCN-1 prior to sending IAM. CCN-1 starts MG negotiation and indicates prioritization in the specified MG list; e.g., MG-1 is listed in the received IAM message. The call setup message being sent to CCN-2 takes the form IAM (BCU-ID=MG-1, MG-list={MG-1[prioritized], MG-2 [prioritized], MG-3, MG-5, MG-6}). Further, the received BCU-ID=MG-1 is sent in IAM to a succeeding node (CCN-2). CCN-2 replies with sending the BCU-ID of the selected MG, here APM (BCU-ID=MG-1).

CCN-2, which terminates MG negotiation, processes the received MG list as described in the last example. If possible it tries to select the MG (i.e., MG-1) specified through the received BCU-ID. The network operator decides that MG-1 and MG-2 should be selected with higher priority for calls served from the Radio Network Controller located in Site 1 and controlled by CCN-1. The operator decides that MG-5 and MG-6 in Site 2 should be selected with a higher priority for calls from the RNC controlled by CCN-2

Figure 8:
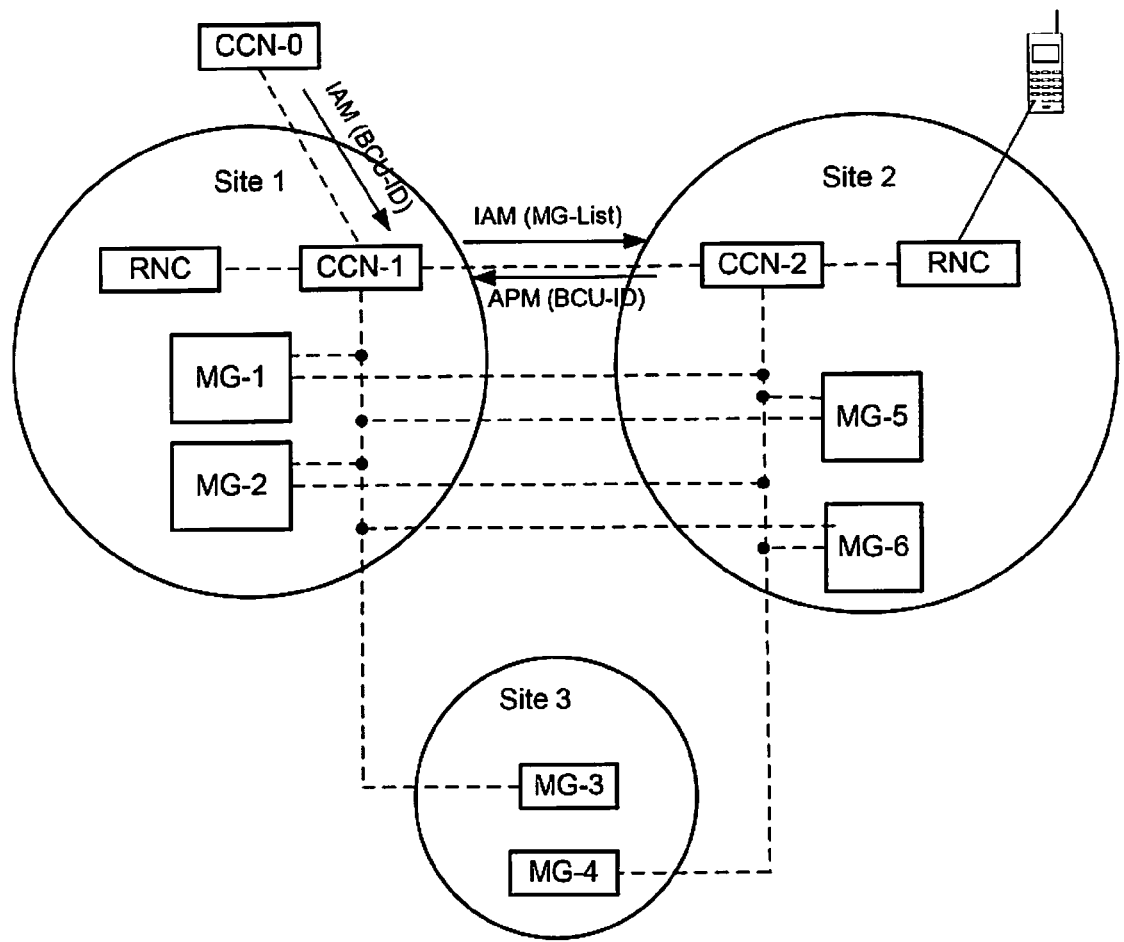
FIG. 8 depicts another call case where no Media Gateway is selected, a BCU-ID is received, and Media Gateway negotiation started according to a further embodiment of the invention.

FIG. 8 depicts another call case where no Media Gateway is selected in CCN-1, prior to sending IAM, a BCU-ID is received in CCN-1, and Media Gateway negotiation started according to a further embodiment of the invention. In this example CCN-0 sends a BCU-ID=MG-0, which is not specified in CCN-1. The call setup message would take the form IAM (MG-list={MG-1[prioritized], MG-2[prioritized] MG-3, MG-5, MG-6}). In this example, as above, the network operator decides that MG-1 and MG-2 should be selected with higher priority for calls served from the Radio Network Controller located in and controlled by CCN-1. The operator decides that MG-5 and MG-6 should be selected with a higher priority for calls from the RNC controlled by CCN-2.

Any transfer node between CCN-1 and CCN-2, removes unknown MG nodes from the MG list as described in the beginning. Priority indication is not taken into account and may not be added to any element in the list.

The termination of MG negotiation is already described above in FIGS. 6 and 7.

Although, the concept refers to a single prioritization, i.e. a MG node is prioritized or not, such a prioritization needs not be a binary type but may encompass different stages of prioritization.

Furthermore, by arranging the BCU-IDs within a list, a prioritization may be expressed. For example, the order of the list itself may serve as a prioritization but also other concepts are encompassed by the invention, such as using a delimiter, a certain BCU-ID which is agreed on as being used as delimiter may separate different portions within a list, thereby indicating different level of prioritizations. Such a delimiting BCU-ID could also be a BCU-ID which is not within the respective controlled MediaGateways of the receiving sides.

As already indicated still a further enhancement is proposed, hereafter termed as "Any MG" Concept. E.g. in case of large networks, a list of MGs within a Media Gateway Group (MGG) might become very long.

If for example the AN node can connect to all MGs in the network, e.g. using IP connectivity, the list would include all MGs the CCN can control via GCP. Therefore, a parameter "any MG" utilizing the acronym, MGG, provides for not sending all specific BCU-IDs but is used as a place holder for a predefined group of MGs. This place holder should indicate which group of MGs can be used by the succeeding CCN.

Normally every CCN can only control a subset of all MGs in the network and the meaning of "any MG" is CCN specific. Therefore, the goal must be to select a common MG and therefore the succeeding CCN should pick a MG knowing which MG can be reused by the preceding CCN. Therefore, a parameter indicating to the succeeding CCN, which group of MGs is meant by the "any MG" indicator is introduced.

A possible solution derived from the above concept is a regional concept similar to region code in telephony numbers. It allows for defining so called border MGs which should be used for calls between regions, i.e. inter-region calls.

In the following a so called "Regional Concept" is further detailed as a still further embodiment of the invention. Assuming large networks, a certain number of CCN will have exactly the same group of MGs, which they can control. Especially, for pooled CCNs this is valid. Additionally, a Blade Cluster CCN can be seen as a region.

This group of MGs shall form a region associated with a MG Region Identifier (MRI). Although in the following a special identifier is introduced, any other identifier allowing for uniquely identifying a group of Media Gateways is equally applicable.

Assigning to these CCN an MRI parameter allows for sending the "any MG" indication with prioritized MGs via BICC to the succeeding CCN adding an MRI. The succeeding CCN now check if it can reuse a prioritized MG of the "any MGG" in the by means of the MRI specified "MG region".

This concept affords that a CCN within another region, e.g. region 2, needs to know when it receives an "any MG" indication and an "MGG region" indication (MRI), which MG of the other region it can control.

This requires, with the administration of MGs in a CCN, a connection to one or more "MG Regions". A CCN of one region should know which MGs can be reused for a call coming from another region.

Further, if the relation MG node and MG identifier is not unique for all regions defined in the network the information in the MG list must specify to which region a specific MG identifier belongs.

Figure 9:
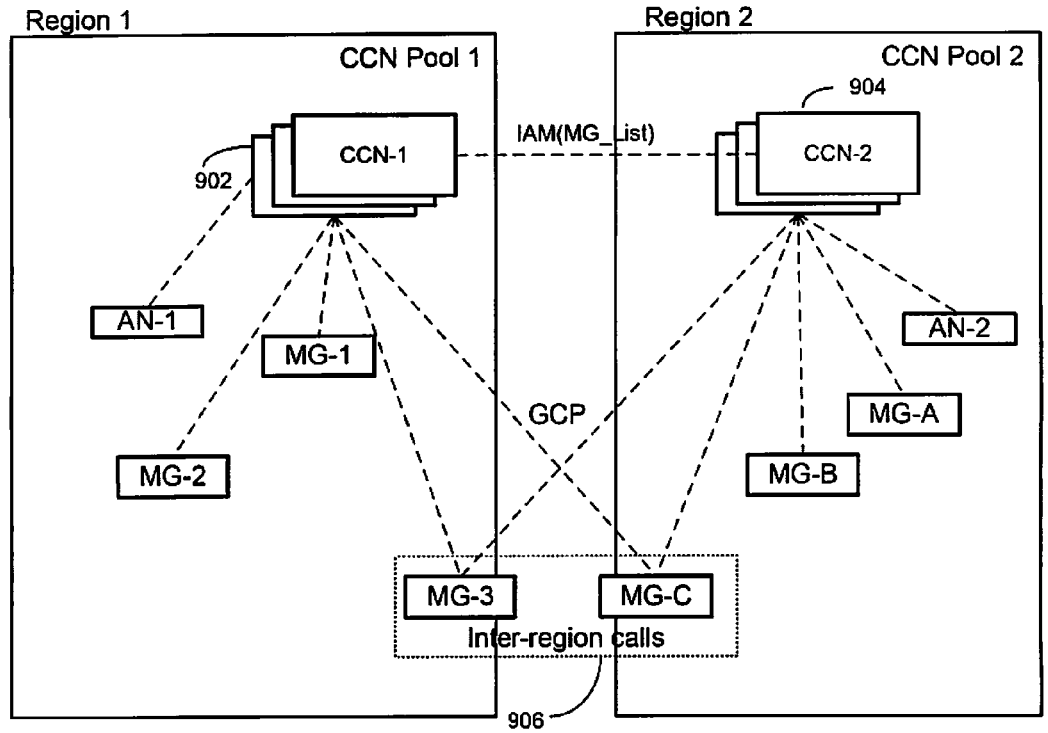
FIG. 9 shows a high level block diagram including Media Gateway Region Identifier (MRI) according to still a further embodiment of the invention.

FIG. 9 shows the Media Gateway Region Identifiers (MRIs), according to a further embodiment of the present invention. Media Gateway Region Identifiers in the present high level block diagram are illustrated here as: Region 1, MRI1: {MG-1, MG-2, MG-3} and Region 2, MRI2: {Mg-A, MG-B, MG-C}. A MG identifier in MRI1 uniquely identifies one MG in Region 1 but can be reused in other regions. A MG identifier in MRI2 uniquely identifies one MG in Region 2 but can be reused in other regions. IAM(MG_list) is more fully defined as IAM (MG_list={{prioritized MGs, other MGs}: Region_ID1, {prioritized MGs, other MGs}:Region_ID2, . . . }). Each region, which could be a CCN pool area, consists of a number of CCN that control all MGs in the region and MGs of another region. If decided in network design, one or more MGs of other regions can be controlled, e.g. MG-3 and MG-C. There, "border MG" would preferably be used for inter-region calls. All calls within a region can be further optimized for using a single MG, see above.

CCN-1 is configured to be able to control any MG in MRI1 and MG-C. In this discussion it is assumed that CCN-1 preferably selects MG-2 for a call originating from AN-1. CCN-2 is configured to be able to control any MG in MRI2 and MG-3. If a call should be established between regions, and CCN-1 902 from originating region 1 allows any MG it can control for the call with MG-2 as prioritized, then BICC transports in a container element "MG_List,={{prioritized MGs=MG-2, "any MG"}:MRI1, {MG-C}:MRI2}. The receiving CCN-2 904 in region 2 analyzes the received MG list and checks it against the information for the destination AN-2. Here, MG-2 is not known and therefore skipped. MG-3 (implicitly specified with "any MG":MR1) and MG-C are identified as common MGs for CCN-1 and CCN-2. Therefore, one of MG-3 and MG-C behave in a sense as "border MGs. In this instance, the supposition is that Network Design decided to use MG-3 or MG-C for inter-region calls 906. A single MGw is used in the call to save resources In other words, two tokens could be used here, i.e. an ANYMG token and a token representing the region (MRI, REGION-TOK). This region token (MRI) can be provided together with a MG identifier or the MG list token "ANYMG". Instead of "ANYMG" plus region token the region token can be sent allown. The options will be shown by the following two examples:

Example 1: Parameter MG-List={{BCU-ID1, BCU-ID2, BCU-ID3}:REGION-TOK-1, {BCU-ID11}:REGION-TOK-2}

Example 2: Parameter MG-List={REGION-TOK-1, {BCU-ID10, BCU-ID11}:REGION-TOK-2}

The Enhancements to the proposed solution have advantages of introducing prioritized MGs, improving MG negotiation and allowing selection of a common MG located close to an AN in call cases where any MG in the network could be selected as well.

Furthermore, sending a BCU-ID to indicate preference is an improvement in call cases where the succeeding node supports the BICC protocol without any proposed enhancement of MG negotiation. Additionally, the introduction of a token ANYMG reduces the data volume to be transferred in MG negotiation in call cases where the CCN can select any defined MG.

Also, the introduction of the regional identifier improves handling of ANYMG in large networks or in networks with implicit network structures. For example, MG nodes controlled by a CCN pool can be configured as a MG region and MG nodes controlled from a CCN Blade Cluster can also be configured as a MG region.

Furthermore, it could be foreseen to send a region identifier alone, if an implementation postulates its use in connection with an ANYMG indication, which then would add no further information. However, such an indication of ANYMG could still be used in case some CCN is able to handle ANYMG but not able to handle a MRI.

Figure 10:
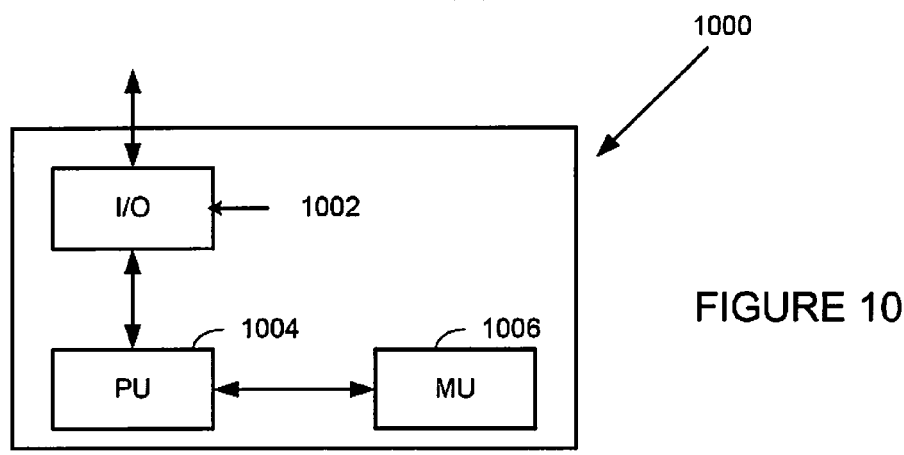
FIG. 10 shows an exemplary Call Control Node being arranged to perform the advantageous methods according to the invention.

FIG. 10 shows an exemplary Call Control Node being arranged to perform the advantageous methods according to the invention. CCN 1000 is provided with one or more Input/Output Unit(s) (I/O) 1002 for receiving and sending messages towards Media Gateways and other Call Control Nodes. A processing unit (PU) 1004 is provided for determining lists of BCU-ID(s) and place holder(s) such as ANYMG and as defined above and a MRI as defined above. The Call Control Node is arranged for selecting a Media Gateway and further comprises a storage unit (MU) 1006 for storing predefined values such as BCU-IDs for border gateways corresponding to MRIs. MU 1006 also provides storage for received or generated MG lists for later use Obviously, an I/O unit (I/O) could be embodied by any kind of Network Interface Card or unit, while the Processing Unit (PU) could be any kind of a processor including a Digital Signal Processor (DSP) or controller or may even be embodied in an ASIC or a FPGA Furthermore, the storage unit (MU) may be embodied in different kind of memory either as a electronic memory such as RAM, EPROM, EEPROM, or storage device such as any kind of optical or magnetic storage medium.

Obviously, all the methods as presented above may be embodied in hardware, software enabled hardware and software offering the corresponding program logic itself when run on a corresponding programmable device, either in part or as a whole.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. In a network, a method of negotiating Media Gateways for use in a call between call control nodes (CCNs), the method comprising the steps of:
   configuring each Media Gateway;
   associating a unique identifier, known to all CCNs, with each configured Media Gateway;
   a first CCN sending a call setup message to a subsequent CCN, the call setup message including a list of identifiers associated with the configured Media Gateways eligible for the call, wherein the first CCN prioritizes and identifies eligible Media Gateways in the list; and
   the subsequent CCN:
     removing unsupported Media Gateways from the list,
     creating a modified list of identifiers associated with the Media Gateways remaining in the list, and
     selecting a Media Gateway from the remaining Media Gateways according to a priority.

2. The method of claim 1, wherein the subsequent CCN is an intermediate Media Gateway and the call setup message containing the modified list of identifiers is forwarded to a terminating CCN.

3. The method of claim 1, wherein the list of identifiers associated with the configured Media Gateways includes all Media Gateways in the network and the list being represented by a token indicating that any configured Media Gateway can be used.

4. The method of claim 1, wherein the Media Gateways are grouped into regions and each region is associated with an identifier of a particular region.

5. The method of claim 4, wherein Media Gateways controlled by a CCN pool or a CCN Blade Cluster can be configured as a Media Gateway region.

6. The method of claim 4, wherein any Media Gateway associated with the particular region identifier can be selected by the subsequent CCN.

7. The method of claim 1, wherein the list of identifiers associated with the configured Media Gateways includes a region identifier representing all configured Media Gateways in a particular region and the Media Gateways supported by the first CCN are situated in more than one region, each region associated with a unique region identifier.

8. The method of claim 4, wherein the ore icular region is classified as a geographical region.

9. The method of claim 4, wherein the particular region is classified as a group of Media Gateways.

10. The method of claim 8, further comprising sending a message to the subsequent call control node including a separate secondary identifier for each geographical region.

11. The method of claim 1, further comprising a group identifier to represent the list of identifiers associated with the configured Media Gateways and the group identifier is such that the group identifier can be passed within a standard Bearer Independent Call Control (BICC) message without any modification.

12. In a network, a Call Control Node for negotiating Media Gateways in completing a call between call control nodes (CCNs), the node comprising:
a processing unit configured to:
configure each Media Gateway,
associate a unique identifier, known to all CCNs, with each configured Media Gateway; and
create a call setup message for a subsequent CCN, the call setup message including a list of identifiers associated with tle configured Media Gateways eligible for the call, wherein the CCN prioritizes and identifies eligible Media Gateways in the list,
wherein the subsequent CCN includes a processing unit configured to:
remove unsupported Media Gateways from the list,
create a modified list of identifiers associated with the Media Gateways remaining in the list, and
select a Media Gateway from the remaining Media Gateways according to a priority.

13. The Call Control Node of claim 12, wherein the subsequent CCN is an intermediate Media Gateway and the call setup message containing the modified list of identifiers is forwarded to a terminating CCN.

14. The Call Control Node of claim 12, wherein the list of identifiers associated with the configured Media Gateways includes all Media Gateways in the network and the list being represented by a token indicating that any configured Media Gateway can be used.

15. The Call Control Node of claim 12, wherein the Media Gateways are grouped into regions and each region is associated with an identifier of a particular region.

16. The Call Control Node of claim 15, wherein Media Gateways controlled by a CON pool or a CON Blade Cluster can be configured as a Media Gateway region.

17. The Call Control Node of claim 15, wherein any Media Gateway associated with the particular region identifier can be selected by the subsequent CCN.

18. The Call Control Node of claim 12, wherein the list of identifiers associated with the configured Media Gateways includes a region identifier representing all configured Media Gateways in a particular region and the Media Gateways supported by the first CCN are situated in more than one region, each region associated with a unique region identifier.

19. The Call Control Node of claim 15, wherein the particular region is classified as a geographical region.

20. The Call Control Node of claim 15, wherein the particular region is classified as a group of Media Gateways.

21. The Call Control Node of claim 19, wherein the processing unit is configured to create a message for the subsequent call control node including a separate secondary identifier for each geographical region.

22. The Call Control Node of claim 12, wherein the processing unit is configured to utilize a group identifier to represent the list of identifiers associated with the configured Media Gateways and the group identifier is such that the group identifier can be passed within a standard Bearer Independent Call Control (BICC) message without any modification.

23. In a network, a system for negotiating Media Gateways in completing a call between call control nodes (CCNs), the system comprising:
each CCN comprising a processing unit configured to associate a unique identifier, known to all CCNs, with each configured Media Gateway; and
the processing unit configured to create a call setup message for a subsequent CCN, the call setup message including a list of identifiers associated with the configured Media Gateways eligible for the call, wherein the CCN prioritizes and identifies eligible Media Gateways in the list,
wherein the subsequent CCN includes a processing unit configured to:
remove unsupported Media Gateways from the list,
create a modified list of identifiers associated with the Media Gateways remaining in the list,
select a Media Gateway from the remaining Media Gateways according to a priority,
mark Media Gateways known to the subsequent CCN as prioritized according to the received list, and
group Media Gateways into regions and associate an identifier with each particular region, wherein Media Gateways controlled by a CCN pool or a CCN Blade Cluster can be configured as a Media Gateway region and a particular region identifier can represent a geographical grouping of Media Gateways.

* * * * *